United States Patent [19]
Laing et al.

[11] 4,174,009
[45] Nov. 13, 1979

[54] LONG-PERIOD THERMAL STORAGE ACCUMULATORS

[76] Inventors: Nikolaus Laing; Ingeborg Laing; Oliver Laing, all of Hofener weg 35-37, 7141 Aldingen bei Stuttgart, Fed. Rep. of Germany

[21] Appl. No.: 860,191

[22] Filed: Dec. 15, 1977

Related U.S. Application Data

[63] Continuation of Ser. No. 616,256, Sep. 24, 1975, abandoned.

[30] Foreign Application Priority Data

| Sep. 30, 1974 | [AT] | Austria | 7858/74 |
| Nov. 20, 1974 | [AT] | Austria | 99290 |
| Apr. 30, 1975 | [AT] | Austria | 13312 |

[51] Int. Cl.² ............................ F28D 1/00; F01K 3/00
[52] U.S. Cl. ................................ 165/45; 165/104 S; 60/659
[58] Field of Search ............. 165/45, 104 S; 60/659, 60/398, 652

[56] References Cited

U.S. PATENT DOCUMENTS

| 3,277,654 | 10/1966 | Shiver . |
| 4,031,952 | 6/1977 | Contour ........................ 165/45 X |

FOREIGN PATENT DOCUMENTS

| 693243 | 8/1964 | Canada . |
| 723370 | 12/1965 | Canada . |
| 962608 | 2/1975 | Canada . |
| 628717 | 12/1921 | Fed. Rep. of Germany . |
| 2021708 | 11/1970 | Fed. Rep. of Germany . |
| 1915371 | 2/1974 | Fed. Rep. of Germany . |
| 1408372 | 7/1965 | France . |
| 2239160 | 5/1973 | France . |
| 2231277 | 12/1974 | France . |
| 17764 | 3/1901 | United Kingdom . |
| 874853 | 6/1958 | United Kingdom . |
| 1227386 | 4/1971 | United Kingdom . |

*Primary Examiner*—Allen M. Ostrager
*Attorney, Agent, or Firm*—Pennie & Edmonds

[57] ABSTRACT

A long-period storage accumulator for storing heat water is used as a storing medium. The water is enclosed in large thin-walled containers which are arranged under the ground. The water pressure forces acting on the container walls are carried by the surrounding of the container.

19 Claims, 17 Drawing Figures

Fig. 4b
Fig. 4a
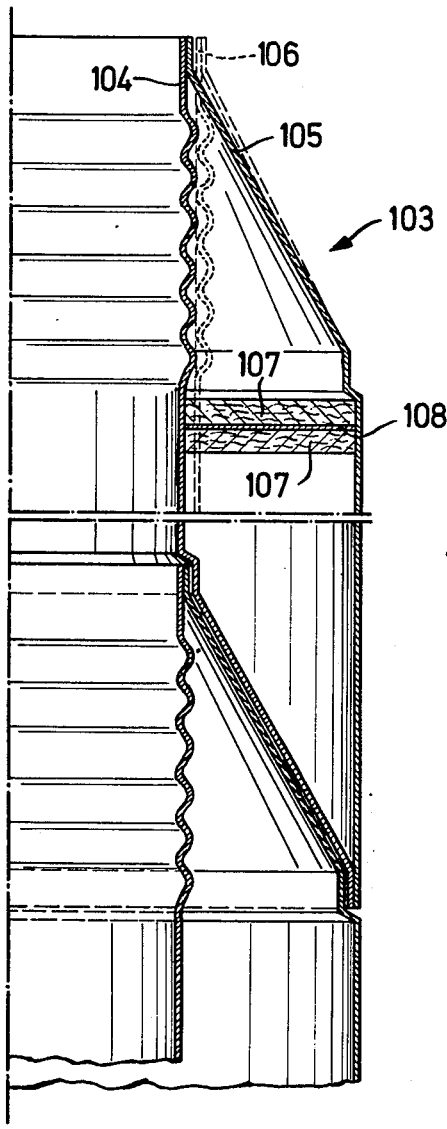
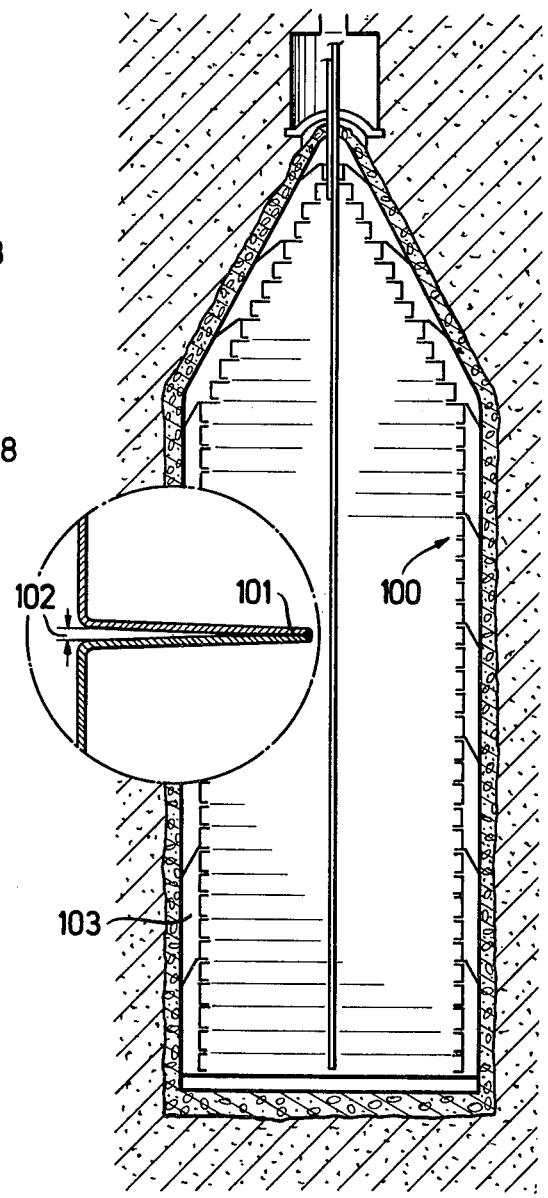

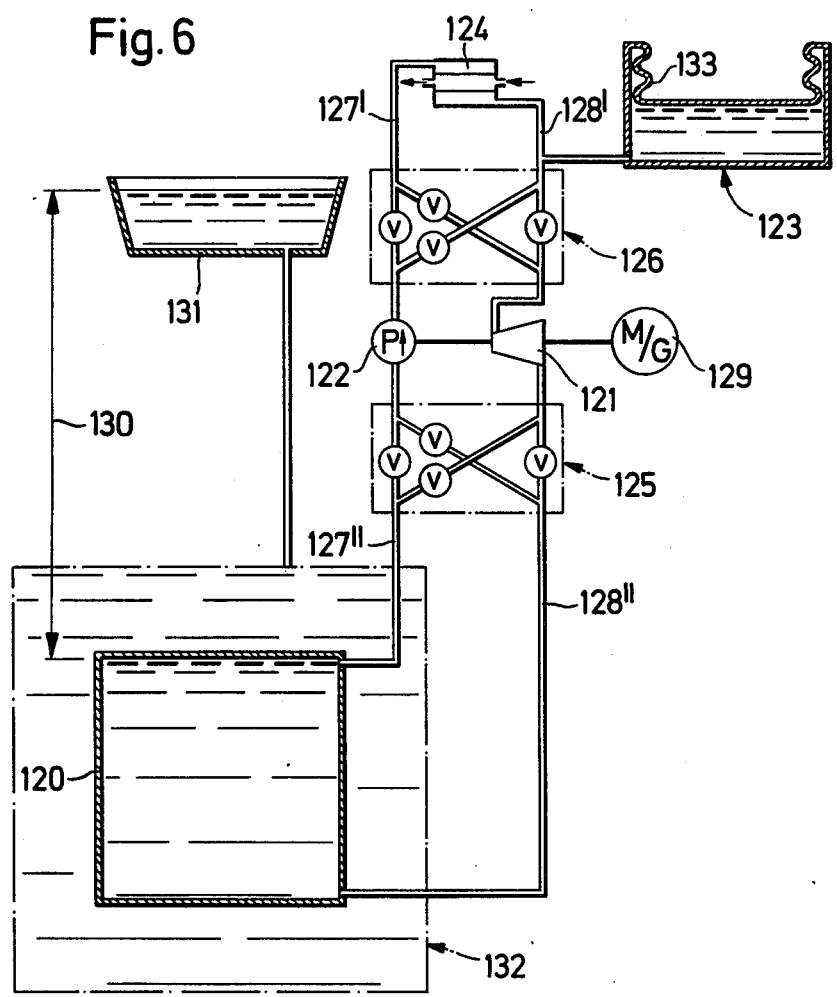

LONG-PERIOD THERMAL STORAGE ACCUMULATORS

REFERENCE TO OTHER APPLICATIONS

This application is a Continuation of our co-pending application Ser. No. 616,256 filed Sept. 24, 1975, now abandoned.

THE PRIOR ART

Thermal storage accumulators based on the heating of water are known. They have not been used industrially as long-period accumulators because the investment into the storage containers, determined by the required container volumes and internal pressures, makes economic operation impossible. The weight of steel for a thermal storage accumulator with a one week capacity in a nuclear power station is larger than the weight of the water to be stored in it. Long-period storage accumulators are defined as accumulators which permit as nearly as possible full-load operation of the steam generator during entire weekends and/or waste heat utilistaion with a time shaft of weeks or even months.

THE OBJECT OF THE INVENTION

One object of the invention is an improvement in the utilisation of primary energy, particularly in nuclear power stations, by means of thermal storage accumulators which are charged with excess primary heat and/or waste heat and held in readiness over prolonged periods. A further object of the invention is a storage system and storage accumulators with containers, the stresses in which are not carried by the container material but by soil or water. In this way, sufficiently large containers can be made economically.

DESCRIPTION OF THE INVENTION

According to the invention, caverns in the ground or, for containers placed under water, external water pressure is used to take up the pressure of the storage medium. This invention can be used for various storage media and storage temperatures.

Three embodiment options according to the invention will be described:

1. Heat sink storage accumulator for condensers of power stations and/or district refrigeration systems.
2. Hot water storage accumulator under pressure enclosed in a cavern for the supply of power stations and/or district heating systems with heat energy.
3. Storage accumulators under pressure placed beneath the water level of a natural or artificial water basin for the supply of power stations and/or district heating systems with heat energy.

The claimed storage accumulators can also be used to advantage in combination and, furthermore, individual distinguishing features of the invention can be used outside the field of long-period storage accumulators. In the exposition below, specific materials and values of quantities are given for the sole purpose of facilitating understanding and should be regarded as examples only.

1. Description of a Heat Sink Storage Accumulator

The efficiency and power output of a power station can be enhanced in making use of the invention by widening the operating temperatue drop during peakload periods with the help of heat sink storage accumulators. A cavern is created by salt-solution mining in a salt rock formation, the volume of which should amount to 1000 m$^3$ per MW of electrical output power of the power station. A saturated water-NaCL solution is contained in the storage accumulator, which serves as the storage medium. During part-load periods, the machine set of the power station drives a refrigeration compressor which compresses a refrigerant, preferably an aliphatic hydrocarbon.

The refrigerant is then condensed in a condenser by a through-flow of e.g. river water and thereupon fed in the liquid state via a throttle valve into the cavern accumulator. Evaporation of the refrigerant proceeds in the accumulator with simultaneous crystallisation of the storage medium. A peak load, the steam discharged from the power station turbine is fed into a condenser, in which a hydrocarbon, e.g. propane, evaporates. This vapour is fed to a low-temperature turbine, the power output of which contributes to supply the peak load demand. The condensation of the propane vapour takes place in a condenser, which is arranged in the storage accumulator. During the periods of peak load, the power station operates as a two-component turbine circuit system. The temperature drop is increased by the amount between +35° C. and −21° C. The efficiency of the power station increases from 33% to 42%. The power output of the plant rises thereby from 1,000 MW to 1,280 MW. A network for the supply of refrigeration plants can also be fed from the same storage accumulator, using the excess power of the power station during low-load periods.

2. Description of a Hot Water Storage Accumulator in a Cavern

Nuclear power reactors usually generate steam. The feed water extracted from the condenser is heated to near boiling temperature by tapped steam extracted from the turbine. The steam enthalpy amounts to 2,890 kJ/kg, whilst the usable enthalpy of the feed water is about 1,235 kJ/kg. The power generation capacity of a turbine plant can become substantially larger if the tapped steam, which withdraws almost half the enthalpy, is not extracted from the turbine but flows through all the turbine stages and produces work.

According to the invention, during low-load periods, the excess thermal energy is used, via the tapped steam or by direct extraction from the circulation, for heating a storage water reserve placed in an underground cavern. The storage water thereby reaches near boiling temperature. In peak-load operation, the heat of the water, if necessary by the interposition of a heat exchanger, is drawn on for pre-heating the reactor feed water, so that, during this condition of operation, no tapped steam is extracted from the turbines, whereby the turbines become capable of producing about 30% more power output. The depth of the storage accumulator cavern is so chosen that the boiling pressure can carry the rock cylinder lying about the accumulator, so that the substantial pressure forces are fully absorbed by the rock.

3. Description of the Underwater Storage Accumulator

If lakes are available or if the power station is situated near the sea, the invention provides the arrangement of a storage accumulator at a depth below the water surface such that, at the foot of the accumulator, the pressure forces of the enclosed storage water are preferably balanced by the external water pressure. In this way, it is possible to use plastic foils as storage accumulator walls. Since the hot water of lower specific weight lies underneath the sea water of higher specific weight, the top cover forms an unstable membrane. For this reason, a membrane of a specific weight exceeding 1 g/cm$^3$ is chosen.

Insofar as gas is used for insulation, according to the invention, this gas is compressed to the same pressure as the outside and the inside media. However, the invention also provides for the thermal insulation to be accomplished by the water itself. Thus water containers according to the invention may remain open downwards, i.e. without additional insulation. Towards the walls and the ceiling, a structure is inserted near the inner wall surface which prevents convection of the water layers adjacent to the wall so that the water penetrating this structure acts as an insulator. For the optimum matching of the temperature prevailing inside the accumulator and diminishing in the downward direction to the temperatures of the water flows to be fed in or extracted, the invention provides tubes or hoses with apertures which can be adjusted in height.

The invention will be described below together with individual elements according to the invention.

FIG. 4a shows an insulating element used in the storage accumulator of FIG. 4b.

FIG. 4b shows a storage accumulator with externally situated insulation.

FIG. 6 shows pumps and turbines to overcome pressure discontinuities.

FIGS. 7b–7e show various float designs used in FIG. 7a.

Figure 1:
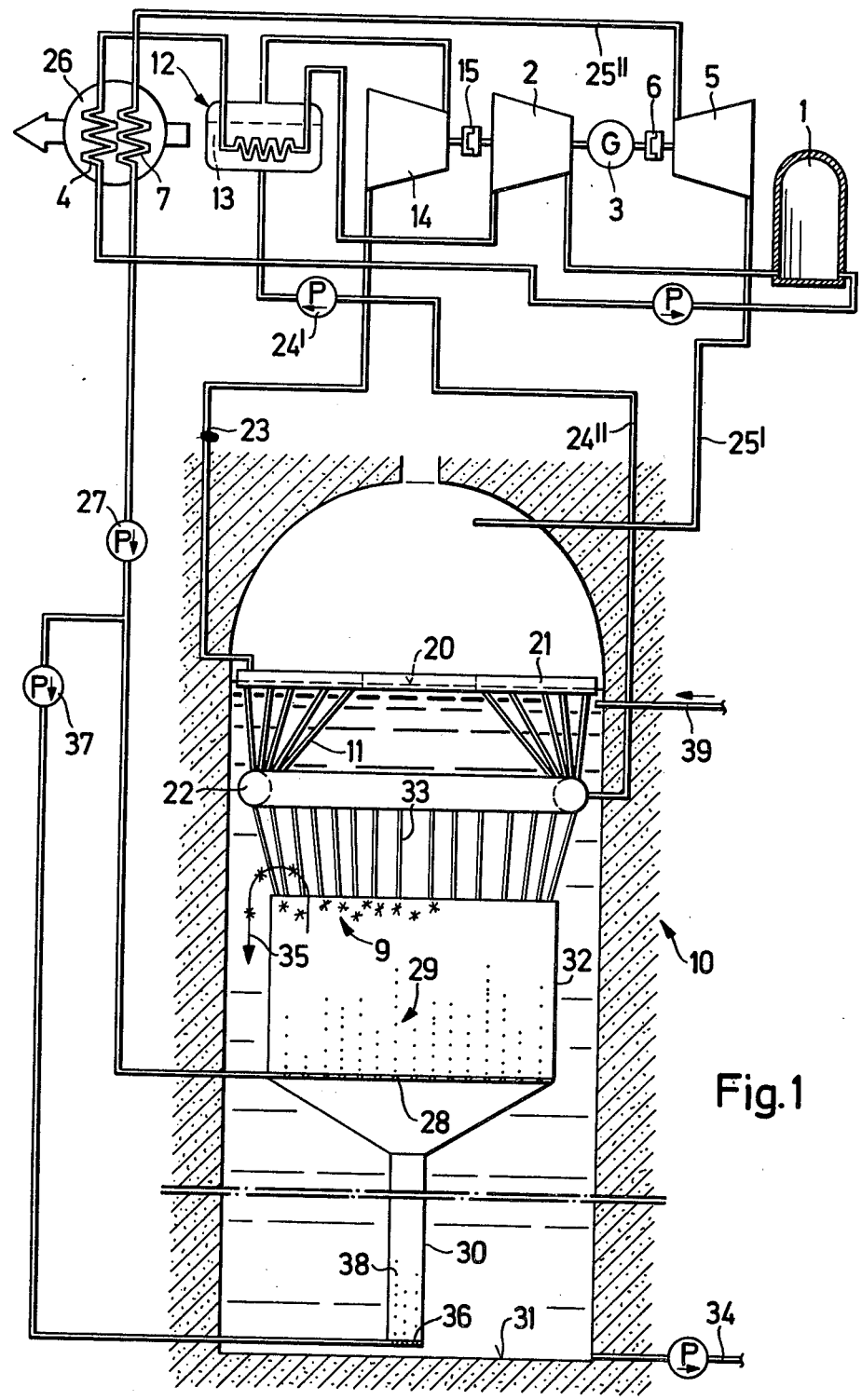
FIG. 1 shows an energy sink storage accumulator according to the invention together with a power station.

FIG. 1 shows the circuit diagram of a storage accumulator and power station components. The reactor 1 generates permanently a thermal power output of 2,380 MW. The steam turbine 2 generates permanently a mechanical power output of a little over 1,000 MW, which, in normal operation, is converted by the generator 3 into 1,000 MW of electrical power output. In normal operation and in low-load operation, the condensation takesplace in the condenser 4 at a mean temperature of about 35° C. In low-load operation, the refrigeration compressor 5 is engaged by the clutch 6. This compressor withdraws a mechanical power output of up to 230 MW from the common shaft and draws in gaseous refrigerant from the upper region of the storage accumulator via the pipeline 25'. The heat of condensation of the refrigerant is transferred via the pipeline 25" in the condenser 7 to the cooling water, which is still cold. The evaporation of the refrigerant takes place after its discharge through the orifice plate 28. Eutectic crystals 9 are produced by the evaporation. Since these are somewhat lighter than the saturated aequeous salt solution, they first wander upwards and subsequently along the arrow 35 until the entire storage accumulator is filled with crystals. A condenser 11 is situated in the upper region of the storage accumulator 10. At peak load, the condensation of the discharged steam takes place in the evaporator 12 which is filled with propane 13. The propane vapour so formed drives the secondary turbine 14 which supplies up to 130 MW to the generator 3 via the coupling 15. In this way, up to 1,130 MW are available for electrical power generation during the peak-load period. The duration of the peak-load operation depends on the power of the refrigeration compressor 5 and on the size of the latent heat storage accumulator 10. For an accumulator of one week's capacity, a latent energy of 4.6. 10$^{11}$ kJ is required. Such an accumulator needs a volume of 1.82. 10$^6$ m$^3$.

An annular hollow body 21 floats on the level 20 of the storage substance. The hollow body forms the steam side collector manifold for the plastic condenser tubes 11. These tubes open out into a weighed-down annular tube 22. The collector 21 communicates with the discharge side of the turbine 14 via the pipeline 23. The pipeline 23 may also be connected to a distributor plate similar to the orifice plate 28 instead of a closed condenser 21, 11, 22, so that the condensation of the discharged steam takes place in the upper regions of the accumulator contents, and the condensate collects above the level 20 so as to be fed back into the circuit via the pipeline 24" and the pump 24'. The compressed refrigerant flows through the pipeline 25" into the condenser 26 and from there, via a condensate pump 27, into the orifice plate 28. When the compressor is in operation, refrigerant condensate 29 enters there into the brine which is pumped up via the central tube 30 from the accumulator bottom 31.

A eutectic brine/ice dispersion forms in the foil cylinder 32 which is braced against the annular collector tube 22 by ropes 33. This dispersion is displaced by the brine flowing outward along the arrow 35. An orifice plate 36 is arranged in the lower region of the tube 30 in order to convey the brine. A small partial flow of the refrigerant condensate, which is pumped by the pump 37, emerges through the orifice plate. In this way, an emulsion 38 is formed in the tube 30. Owing to its low densitiy, the emulsion rises. The maximum energy sink capacity is reached when the entire volume of the accumulator is filled with the brine/ice dispersion, wherein the proportion of the brine is allowed to diminish down to 20%.

The construction of the storage accumulator takes place preferably in salt rock by solution mining with water. No lining of the cavern is required because a saturated aequeous salt solution is formed whereby a further dissolution of the salt rock is prevented.

The storage accumulator thus forms an energy sink, which leads to an increase of the temperature drop between the steam generator 1 and the storage accumulator, which serves as a condenser during peak-load operation. A peak-load is thereby provided by the turbine 14. During low-load operation, on the other hand, the compressor 5 is driven.

Refrigeration brine may be additionally extracted through the pipeline 34 for a supply network to refrigeration plants. The brine throughput flows through the pipeline 39 back into the storage accumulator.

Figures 2A, 2B, 2C:
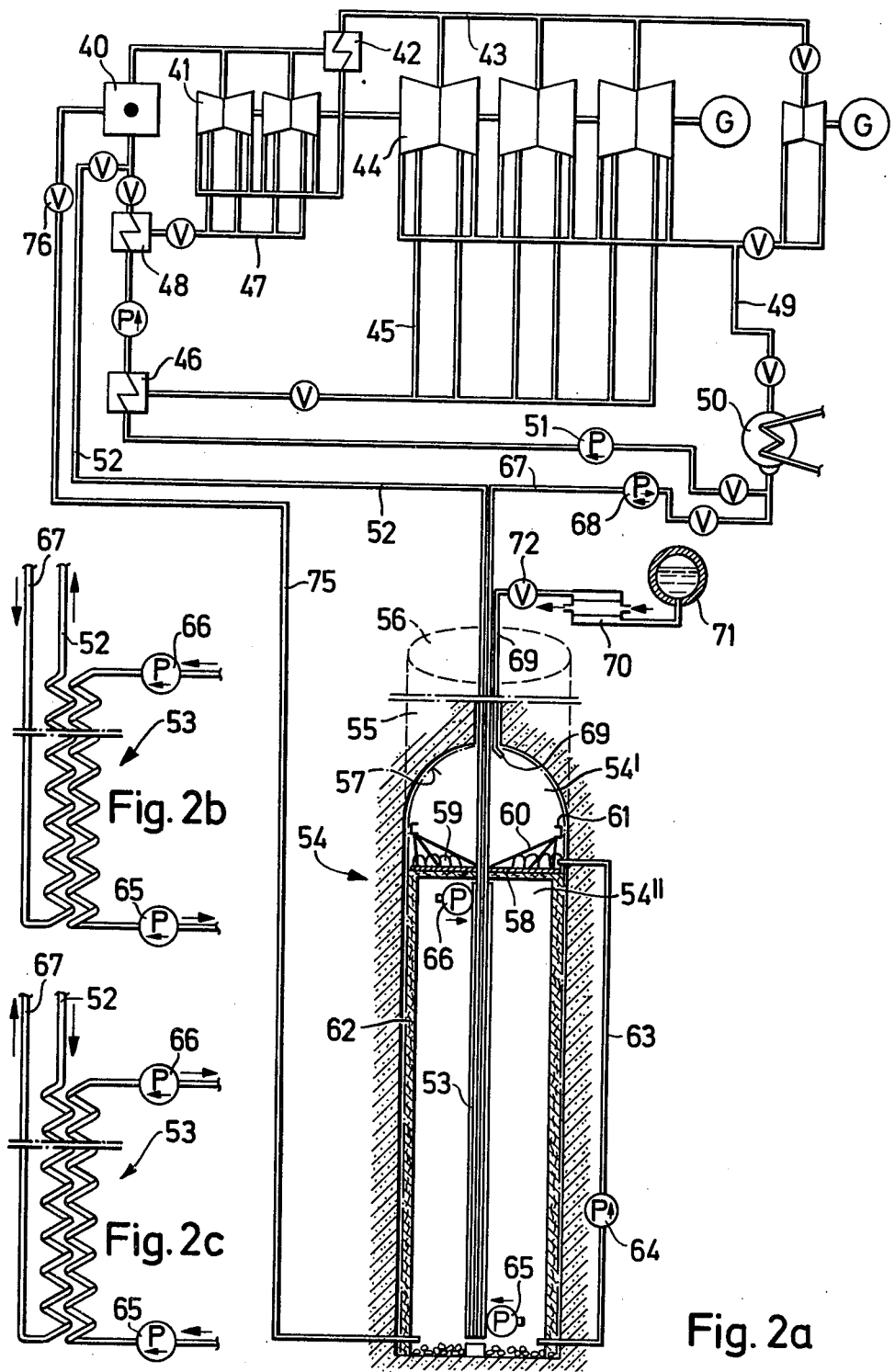
FIG. 2 shows a hot water storage accumulator together with a power station.

FIG. 2a shows a hot water storage accumulator. The steam generator 40 supplies the high-pressure turbine 41 and the intermediate superheater 42 with fresh steam. The superheated steam proceeds via the pipeline 43 into the low-pressure turbine 44. From there, tapped steam flows through the pipeline 45 into the feed water pre-heater 46. High-temperature tapped steam enters via the pipeline 47 into the high-temperature pre-heater 48 so that the feed water reaches the evaporator 40 at near boiling temperature. The discharged steam flow reaches the condenser 50 via the pipeline 49, whilst the condensate flows through the boiler feed pump 51 into the pre-heater 46.

By opening the valve in the pipeline 52, hot water enters the heat exchanger 53 of the cavern storage accumulator 54. The accumulator is placed at such a depth that the rock column 55 has a weight equal to the projected area 56 multiplied by the internal pressure in the accumulator 54.

The accumulator wall consists of a plastic foil 57. The accumulator space is sub-divided by an intermediate plate 58 into two regions 54' and 54". This intermediate plate is weighed down by weights 59 and, if necessary, braced into a flat shape by ropes 60 which are carried by tension fittings 61. The region 54" is lined with an insulating layer 52. The pipeline 63 with the pump 64 is situated between the two regions 54' and 54".

The heat exchanger is traversed either by a flow of cold water (during charging) from the pump 65 or by a flow of hot water (during discharging) from the pump 66. In order to discharge the accumulator, the hot water traverses the heat exchanger 53 and thereby heats the feed water flowing through the heat exchanger, as shown in FIG. 2b. The heat exchanger separates the turbine circulation from the storage accumulator circulation so that the hydrostatic pressure, if it exceeds the boiling pressure in the pipelines 52 and 67, does not act on the accumulator walls.

When charging the cooled water returns into the turbine circulation via the pipeline 67 by the interposition of the pump 68, whilst the pump 65 pumps cold accumulator water through the heat exchanger 53. The cold accumulator water, after being heated up, discharges through the inoperative pump 66 (FIG. 2c).

During the charging process, the water in the space 54" expands. A corresponding quantity of cold water is pumped by the pump 64 into the space 54'. A pipeline 69 communicates with the space 54' and also, via the heat exchanger 70, with an insulated liquid gas accumulator 71.

The circuit diagram for discharging the accumulator is also shown in FIG. 2b. The cold boiler feed water is pumped by the pump 68 via the pipeline 67 into the heat exchanger 53 and fed via the pipeline 52 in a hot condition to the evaporator 40.

For this purpose, the pump 66 extracts hot water from the highest level of the accumulator space 54". After transferring the heat to the feed water, the hot water flows through the pump 65 back into the accumulator space.

An aliphatic hydrocarbon is preferably used as a gas cushion. The temperature in the liquid gas accumulator 71 is so chosen that it lies below the critical temperature of the gas. The valve 72 prevents the condensation of the entire gas quantity.

The size of the reserve in the accumulator 71 is so chosen that the entire space 54' can be filled with gas at the boiling pressure of the storage water. A pipeline 75 leads from the lower region of the storage accumulator to the core of the reactor 40. In case of emergency, the portion within the accumulator which is below 100° may be used, via the valve 76, for emergency cooling even without pump operation.

Figure 3:
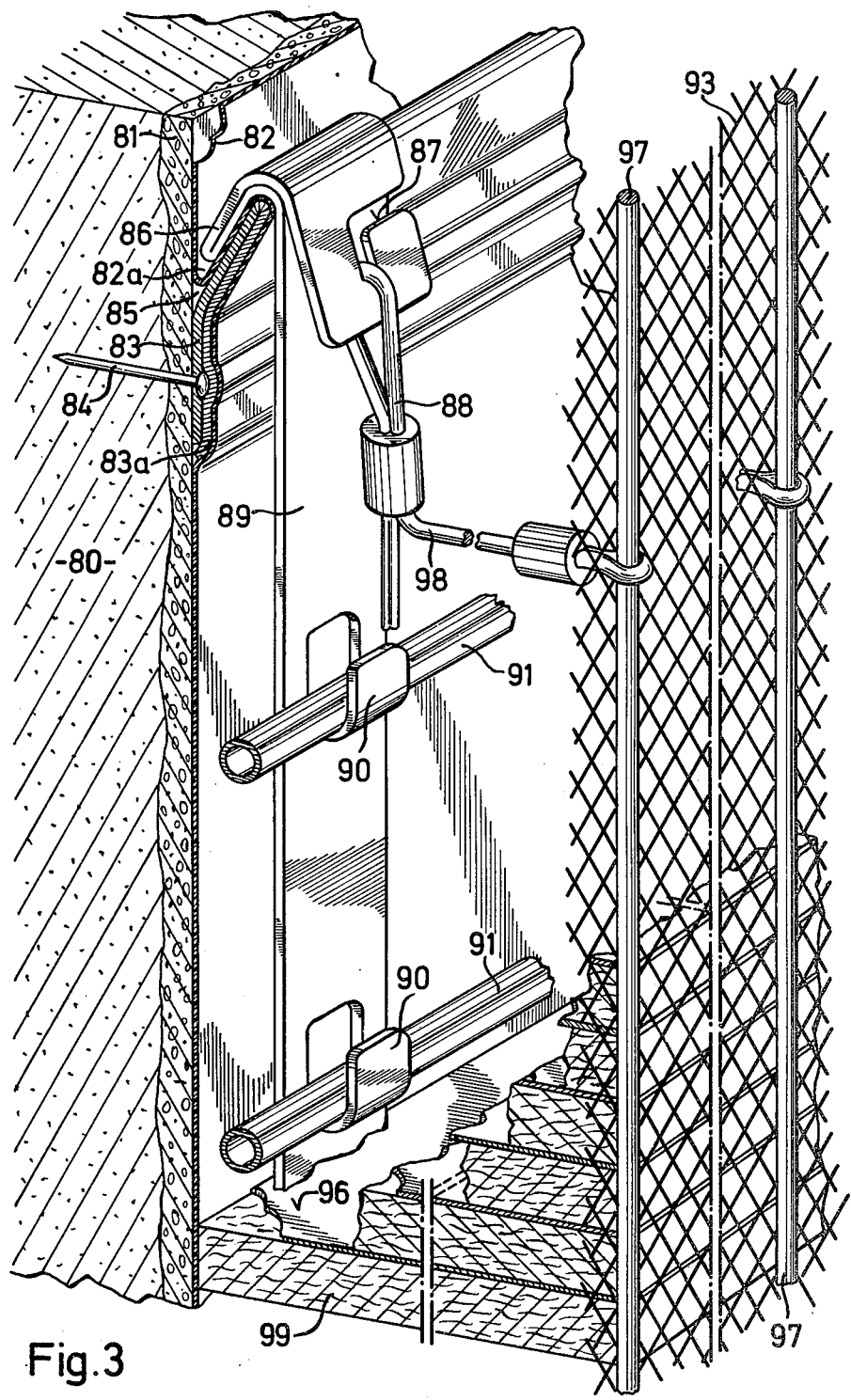
FIG. 3 shows an internally situated insulation.

FIG. 3 shows the wall lining of the storage accumulator according to FIG. 2. A smooth rendering 81 is applied to the rock 80. A plastic foil 82 closely fits this rendering. At specified distances, metal profiles 83 formed as horizontal hoops are arranged and fastened to the rock 80 by steel nails 84. The web 83a of the metal profile 83 is folded back and covers the heads of the nails 84. Undercut regions 85 are formed between the profile 83 and the wall 81, in which a fold of the plastic foil 82 and metal hooks 86 are inserted. Recesses 87 are cut in these hooks for suspending the tension cables 88. Clips 90 are stamped out in the lower web 89 of the hook components, in which coolant tubes 91 are inserted. The foil 82 is thus made into a fold 82a in the region of the hooks and is fastened to the rock wall 80, 81 without being perforated by nails. The insulation consists of layers 99 which are covered on the inside with a wire netting 93. These wire nets 93 are held in position by rods 97 and ropes 98. The insulating material 99 consists of hydraulically and thermally resistant mineral fibres or else of metal fibres, coal power or coke and is permeable to water, whilst it prevents thermal convection and the mixing of water layers near the wall so that a temperature drop of up to 300° C. is sustained between the wire netting 93 and the cooling water tubes 91. Foils 96, e.g. of aluminium, are arranged between the layers of the insulation 99. These foils prevent vertical convection. The cooling water pipes 91 are traversed by cold water which is at the same pressure as the water enclosed within the accumulator so that, inside the insulating layer, a temperature gradient prevails between the accumulator water temperature and the cooling water temperature and the foil 82 can never assume excessively high temperatures.

FIG. 4a shows another design of the storage accumulator. The accumulator container proper 100 consists of steel rings made of U-profiles, the flanges of which are welded together as shown at 101, whilst the vertical webs leave gaps 102 between each two profiles, whereby the longitudinal expansion can be absorbed. The insulation is provided by hollow insulating elements 103.

FIG. 4b shows the design of such a hollow insulating element 103. The wall 104, facing the accumulator container, has corrugations which absorb the longitudinal expansion. The conical wall 105 can yield according to the broken line illustrated at 106 when the accumulator container 100 increases in its diameter. Mineral wool slabs 107 are placed inside the annulus, between which intermediate layers 108 are situated to prevent convection.

Figure 5:
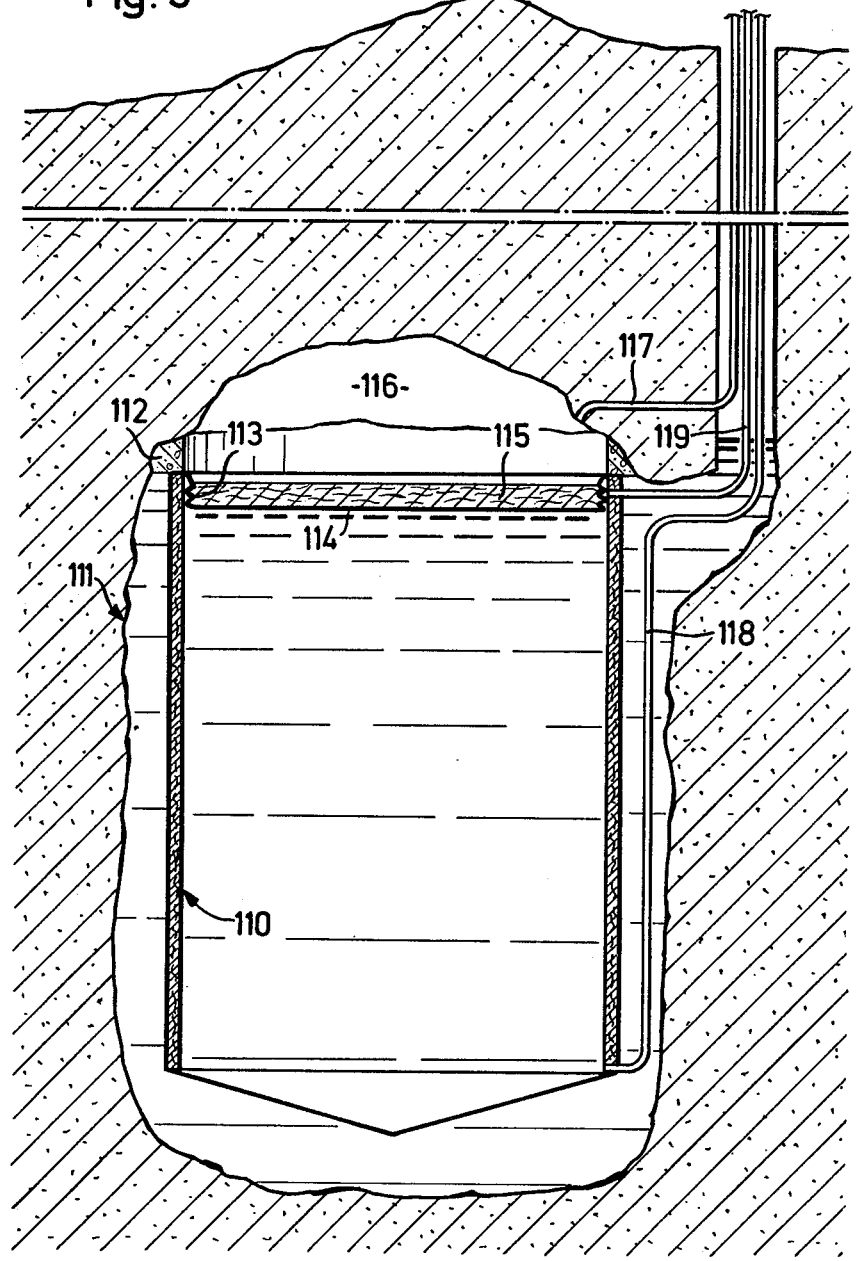
FIG. 5 shows a storage accumulator with a flooded cavern.

FIG. 5 shows a storage accumulator according to the invention which is arranged to float in a cavern. The accumulator container 110, the wall of which is insulated either by internal insulation, as shown in FIG. 3, or by external insulation, as shown in FIGS. 4a and 4b, floats in the flooded cavern 111. The accumulator wall is anchored to a supporting ring 112. An annular bellows-type component 113 is joined to the supporting ring. The bellows component carries the cover 114. This cover is overlaid with an insulating layer 115. Compressed gas or liquid under pressure is injected through a pipeline 117 into the space 116 above the cover. The cold water and hot water pipelines 118, 119 are connected to pumps or turbines, respectively. The cold water pipelines also communicates with an expansion tank 131 (FIG. 6).

According to the invention, the inside of the cavern 111 can also be filled with compressed air or nitrogen. In all cases, the storage accumulator can also be placed inside a mountain, where the shaft may be horizontal, too.

FIG. 6 shows diagrammatically an arrangement according to the invention. The accumulator container 120 communicates, via a turbine 121 and a pump 122, with an expansion container 123 covered by a membrane 133 and with the heat exchanger 124. The valve batteries 125 and 126 are so controlled during discharge that the hot water pipelines 127' and 127" are connected via the turbine 121, whilst the cold water pipelines 128' and 128" are connected via the pump 122.

Since the density of the cold water is greater than that of the hot water, the turbine supplies, even without taking account of efficiencies, less power than is needed by the pump 122. The power deficiency is balanced by a motor-generator 129. In the reverse flow condition during discharging, the power generated by the turbine 121 may be larger than the power absorbed by the pump 122. If so, the motor-generator 129 may be operated in a generating mode. The pipelines 127 and 128 are then appropriately changed over. In conjunction with suitable automatic control elements, the turbine and pump achieve a compensation of the hydrostatic column pressure in the pipes 127' and 128' which span the height difference 130. In this way, the accumulator container 120 is relieved of hydrostatic pressure.

The tank 131 communicates with the inside of the cavern 132, whereby a pressure forms inside the cavern which results from the height difference 130.

Figure 7A:
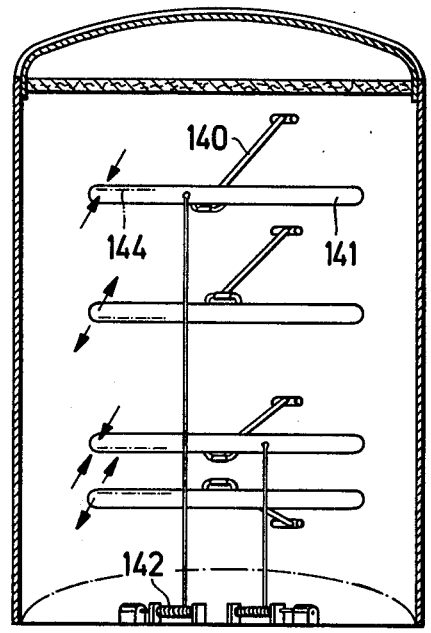
FIG. 7a shows tubes with apertures adjustable in height.

FIG. 7a shows the design of the feeding and extraction pipelines. Since temperature stratification forms in the accumulator and the need arises to perform feeding and extraction at optimum temperatures, the invention provides the use of tubes 140 which can be adjusted in height. To prevent turbulence, a float 141 can be arranged at the end of the tube 140 which can be adjusted to the desired height by means of a winch 142 or by changing the gas quantity in a hollow body 143 situated inside the float 141.

Figure 7B:
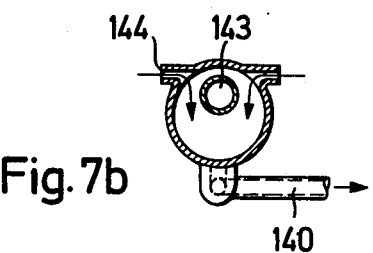

FIG. 7b shows the cross-section of the float with a float body 143 and the suction apertures 144 situated on top for the induction of hot water.

Figure 7C:
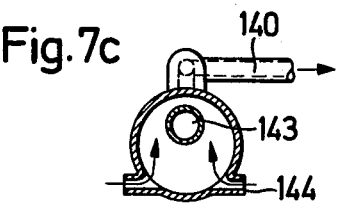

FIG. 7c shows the design of the float for the induction of cold water.

Figure 7D:
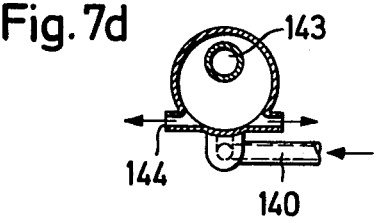
Figure 7E:
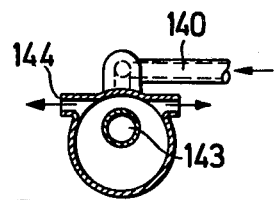

FIG. 7d shows the float for the discharge of warm water and and FIG. 7e shows the float for the discharge of cold water.

Figure 8:
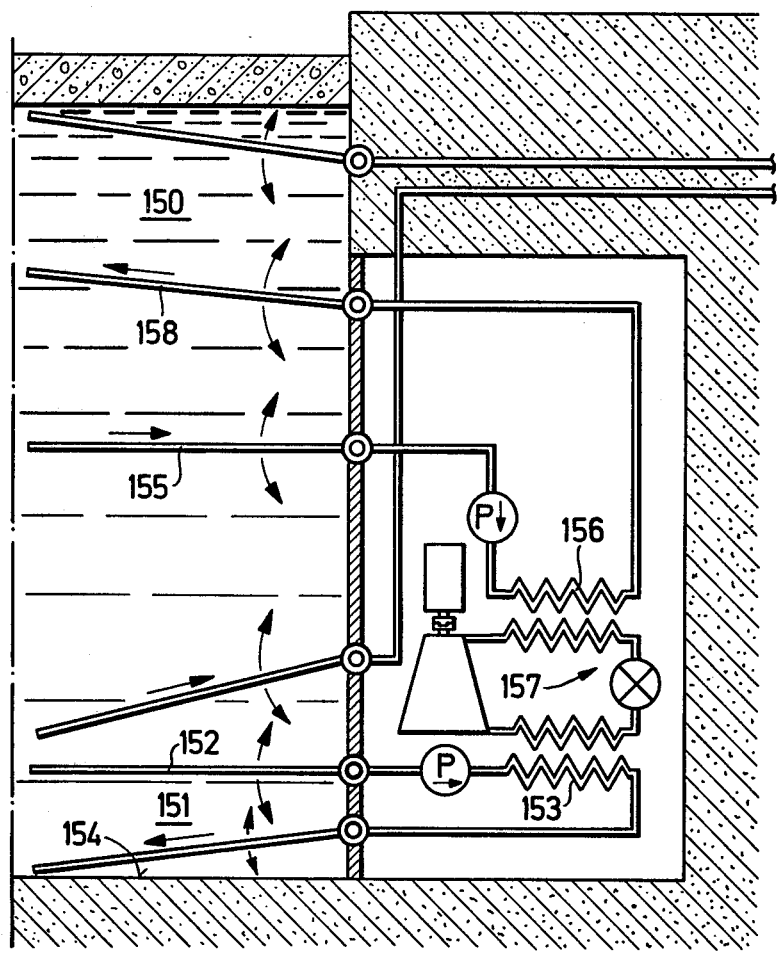
FIG. 8 shows an accumulator for storage in layers with equipment for increasing the temperature difference between the layers.

FIG. 8 shows a circuit diagram which serves for the optimisation of the temperature gradient inside the storage accumulator. The pipe 152 extracts water from the cold region 151 and cools this water in the heat exchanger 153 so that even colder water emerges at the bottom 154, whilst the pipe 155 extracts warm water from the upper region, heats it up in the heat exchanger 156 of the heat pump 157 and returns this water through the pipe 158, situated at a greater height, into the hotter region 150.

Figure 9:
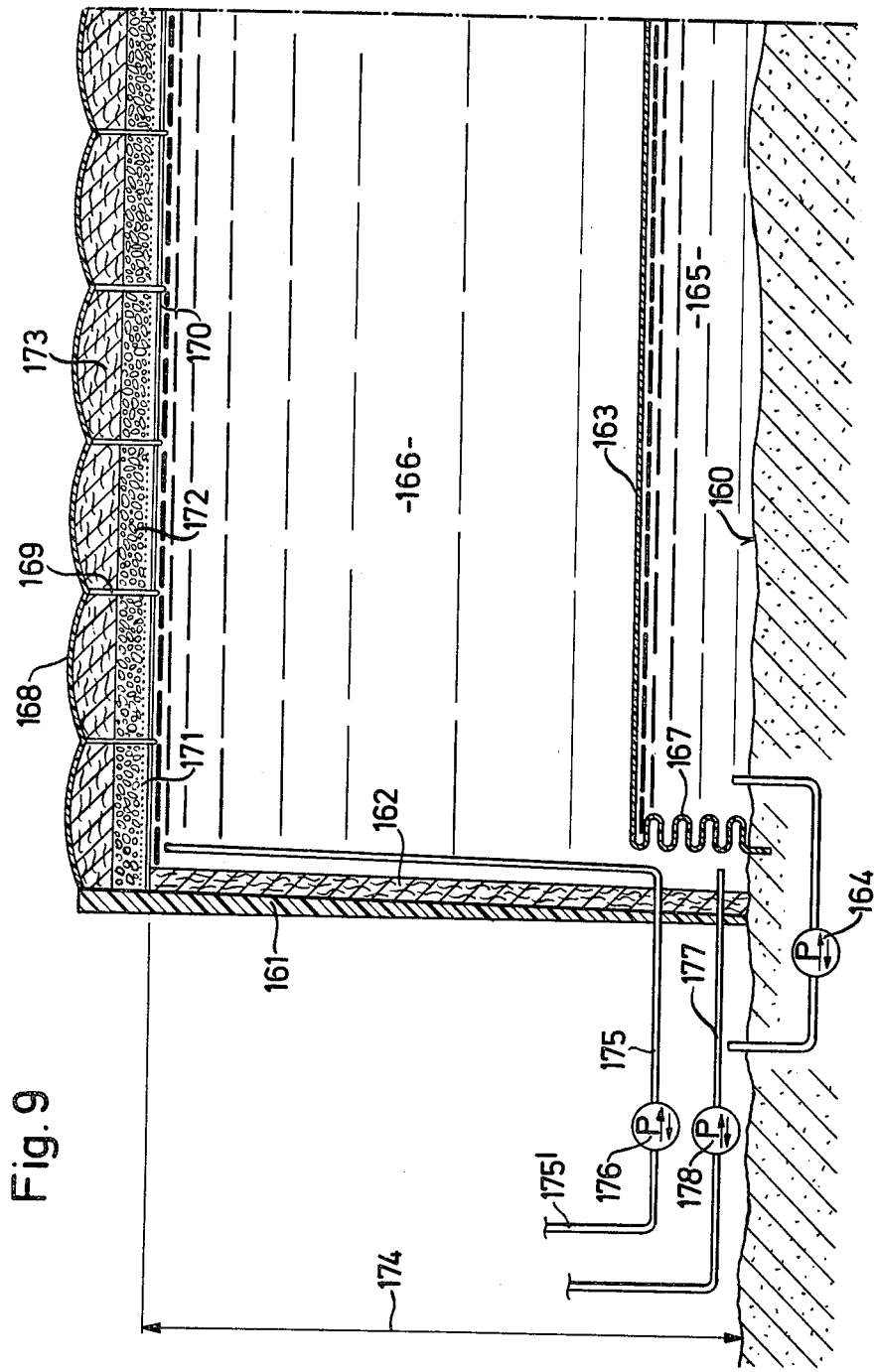
FIG. 9 shows a storage accumulator for undersea installation.

FIG. 9, which is not to scale, shows an accumulator according to the invention, which is arranged at the bottom of the sea 160. The outer wall 161 is formed as a body of revolution and increases upwards in its wall thickness because it has to resist the internal pressure which increases in the upward direction. According to the invention, this wall consists preferably of strips made of glass fibre reinforced synthetic material and has on its interior wall an isolating layer 162.

The space 165 serves as an expansion chamber for the changing density of the water enclosed in the storage accumulator space 166. Alternatively, the accumulator can be operated at constant mass. However, the enclosed storage water can also be extracted. This procedure depends on the expansion bellows portion 167 of the foil 163 having approximately the dimensions of the wall 161.

The cover of the accumulator container consists of an outside wall 168 which is preferably made of plastic foil. Tension ropes 169 are attached to this wall which carry a steel wire net 170. The steel wire net is panelled with a fine-mesh wire gauze 171.

A layer 172 of sand or stones is placed above this net structure and, above this layer 172, a further layer 173 of mineral wool. The weight, less the buoyance of the layer 172, must be larger per unit of area than the pressure difference resulting from the density difference between the hot water inside the container and the sea water outside the container, multiplied by the height difference 174. If a pressure difference remains, it is overcome by the pump 164.

In charging or discharging, hot water is conducted through the pipeline 175'. The turbine-driven pump 176 overcomes the excess pressure in the pipeline 175' due to the depth postion in the sea. The pipeline 177 is relieved by the turbine-driven pump 178. The depth below sea level must be chosen in accordance with the boiling pressure. At 350° C. water temperature, for example, the required depth amounts to about 1,650 m.

Figure 10:
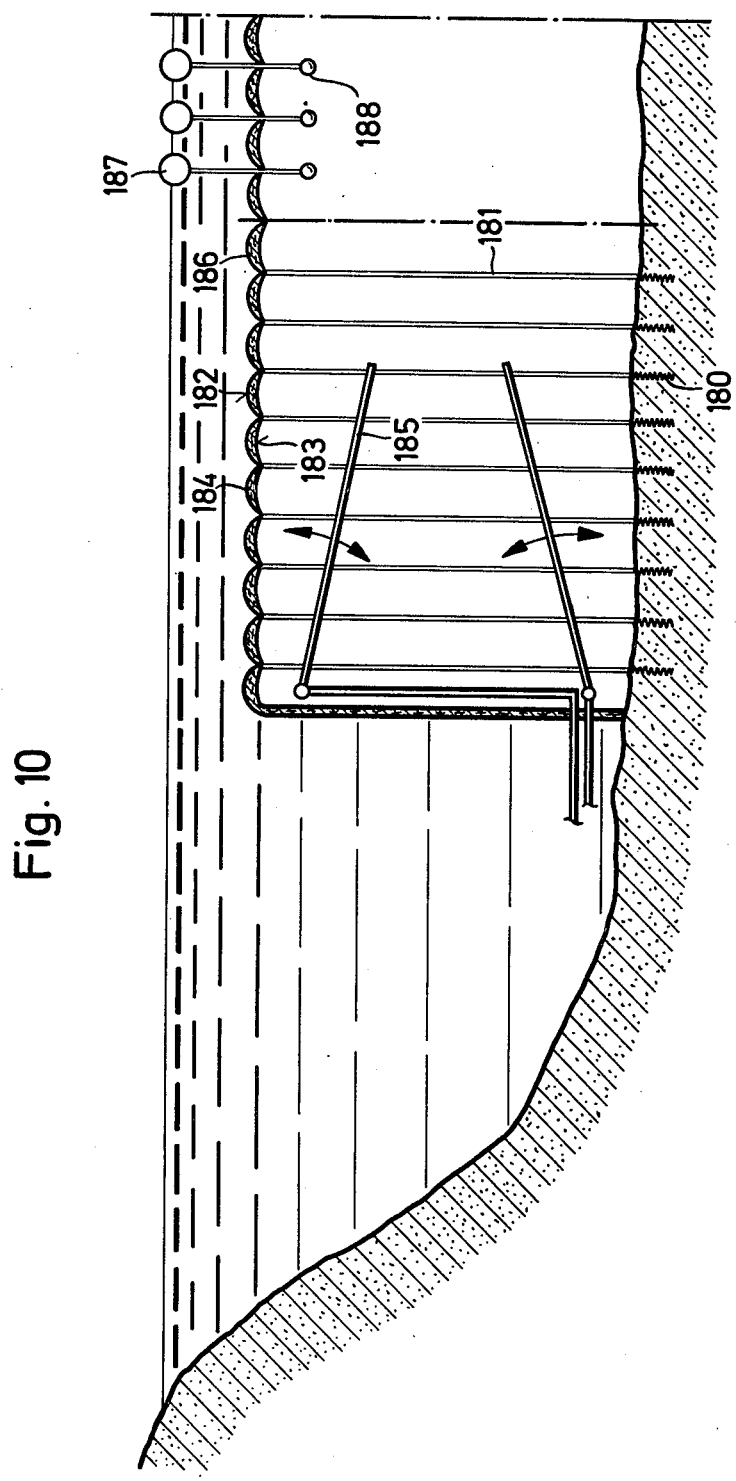
FIG. 10 shows a storage accumulator for undersea installation, especially for low temperatures.

FIG. 10 shows a modified arrangement in a lake. If the bottom of the lake is accessible, anchors 180 are fixed in the bottom. The covering foil 182 is held in a horizontal position by ropes 181. A wire netting 183 is preferably suspended underneath the covering foil. Mineral wool or, at lower temperatures, an organic fibre wool is placed inside the space 184 so formed.

Tubes 185 with apertures which can be adjusted in height are situated inside the storage accumulator.

If the lake bottom is marshy, an arrangement shown on the right is used. The covering foil 186 is weighed down by weights 188 which are evenly distributed. A float 187 is associated with each weight. The volume of the floats is larger than that corresponding to the residual weight of the bodies 188.

Figure 11:
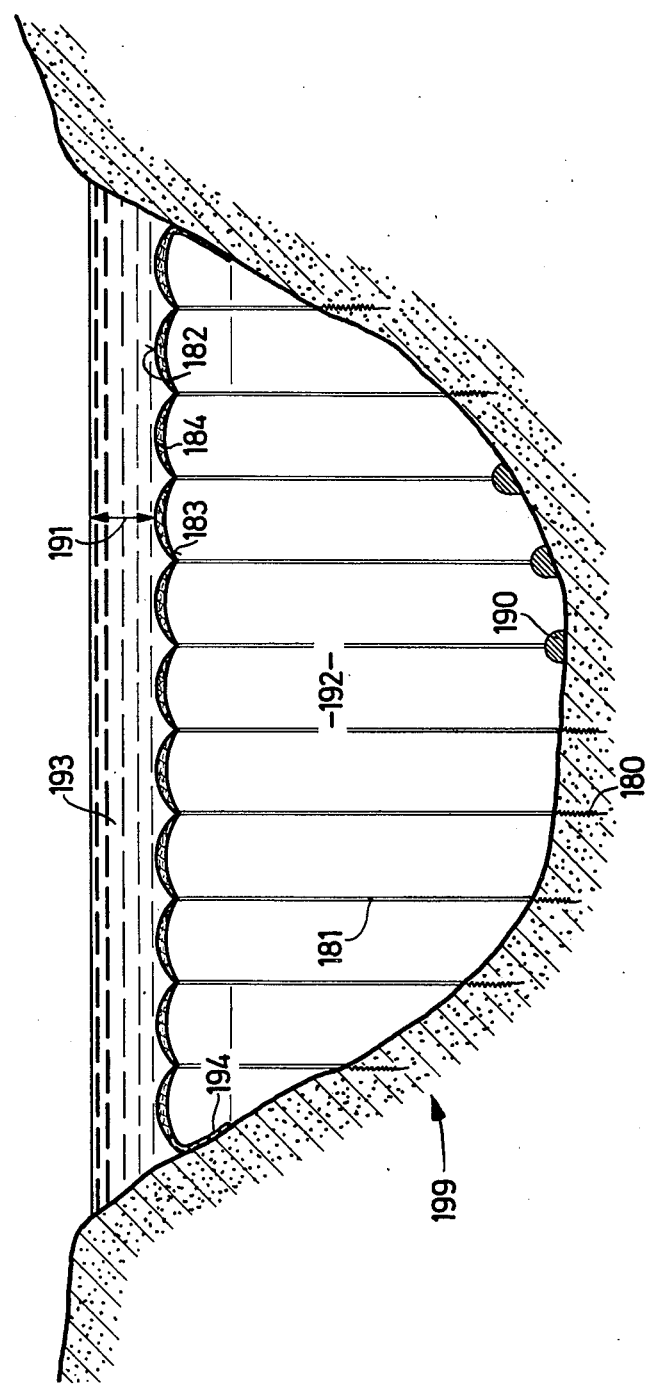
FIG. 11 shows a lake as a storage accumulator.

FIG. 11 shows another arrangement of a storage accumulator which can be embodied in lakes of which the total volume is approximately equal to the desired accumulator volume. As before, tension anchors 180 or weights 190 are arranged at the bottom 199 of the lake. A covering 182, 183, 184 is placed at a depth 191, which leads to a preliminary pressurisation inside the storage accumulator 192 to a value higher than the boiling pressure of the stored water. The upper region 193 remains full of cold lake water. Surrounding foil lip 194 which separate the two water layers from each other are provided to seal against the rising shoes of the lake.

Figure 12:
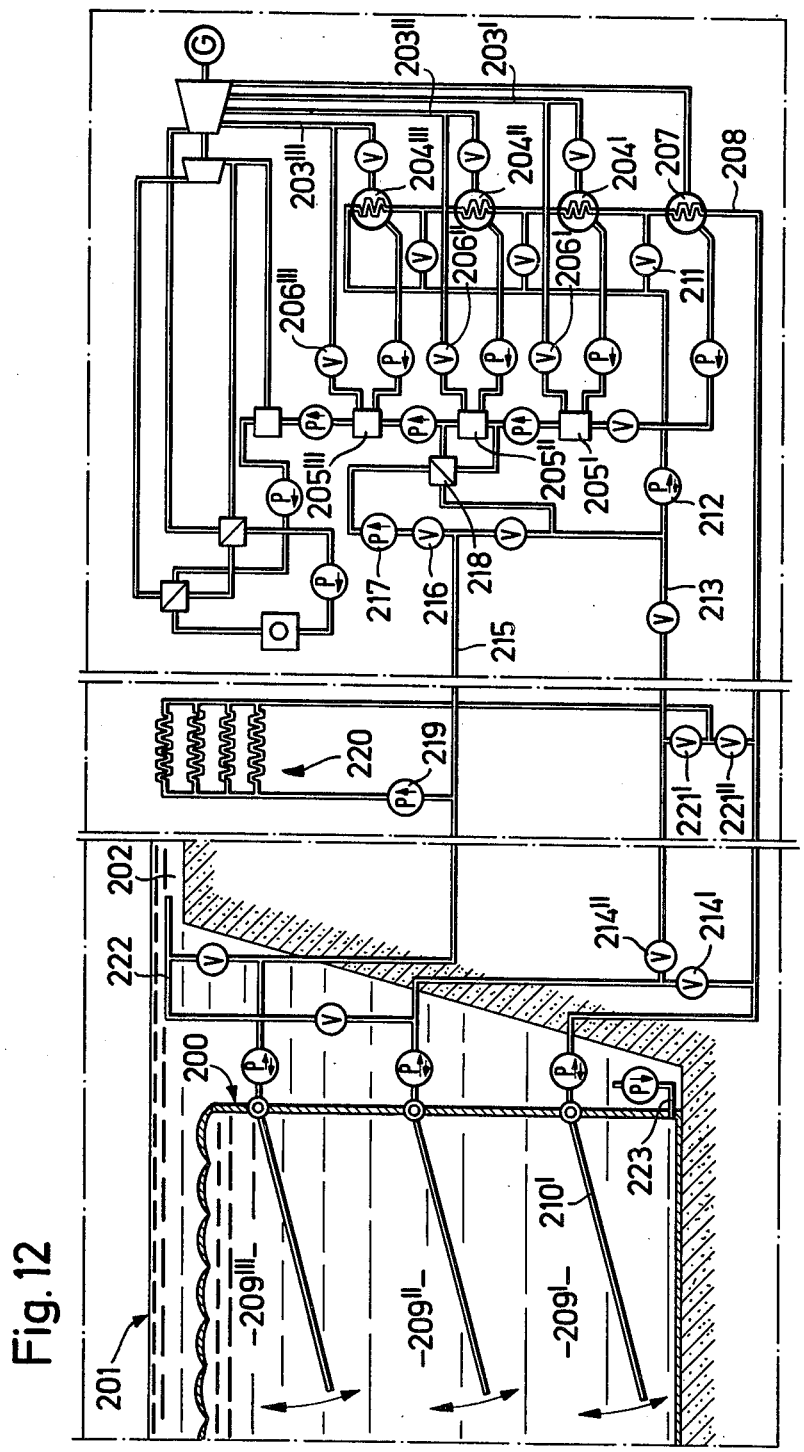
FIG. 12 shows a power station plant with a waste heat storage accumulator.

FIG. 12 shows an example of the application of a low-temperature storage accumulator 200, according to the invention, which is placed in a lake 201, communicating with a river 202. The tapped steam pipelines 203', 203" and 203'" are connected to the condensers 204', 204" and 204'". In addition, feed water pre-heaters 205', 205" and 205'" are provided, which, in an appropriate control position of the valves 206', 206" 206'", can absorb the tapped steam. The main condenser 207 is connected, via a pipeline 208, to the lower region 209' of the storage accumulator 200. By swivelling the tubes 210', the desired water temperature can be fed in.

During peak-load operation, the cold water, via the main condenser 207, the valve 211, the pump 212 and the pipeline 213, reaches the intermediate region 209" of the storage accumulator 200. At a sufficiently low power station load, the condensation takes place in one of the condensers 204. If the condenser temperature is high enough, the cooling water extracted from the region 209" and fed, via the valve 214', into the pipeline 208, whilst the valve 214" is shut and, after heating up through the pump 212 and the pipeline 215, is conveyed into the upper region 209'" of the storage accumulator.

In peak-load operation, hot water may, in addition, be withdrawn from the upper region 209'" and supplied, via the pipeline 215, the valve 216 and the pump 217, to the heat exchanger 218 for heating the feed water. In order to withdraw the heat, the pump 219 pumps hot water into the district heating network 220. This hot water is returned either into the lower region 209' or the intermediate region 209" by appropriate control of the valves 221' and 221". If the heat extraction by the district heating network 220 is insufficient, feed water is bled from time to time via the pipeline 222 into the river 202. Out of consideration for the least possible thermal pollution of the river, the bleeding takes place at times when the river water is particularly cool or when the river flow is particularly large. A corresponding amount of fresh water is returned from the lake into the storage accumulator via the pipeline 223.

We claim:

1. A long-period heat storage accumulator comprising a wall structure for containing a large volume of hot water within the accumulator interior and having means for filling and removing hot water therefrom, the improvement comprising in that the wall structure comprises in part a flexible covering including tensioning ropes for holding said covering against vertical movement and in that said accumulator is adapted to be completely submerged in water whereby the pressure of the hot water exerting forces on said wall structure is counteracted in part by the pressure of the water exterior of the accumulator exerting forces on the wall structure.

2. A long-period heat storage accumulator according to claim 1 having in addition rock adjoining the wall structure exterior of the accumulator.

3. A long-period heat storage accumulator according to claim 2 wherein said wall structure comprises in part a top wall and where said rock lies on said top wall and where the weight of the rock is approximately equal to the forces exerted by the hot water on said top wall.

4. A long-period heat storage accumulator according to claim 1 having in addition weights connected to said covering to prevent vertical movement of said covering.

5. A long-period heat storage accumulator according to claim 4 wherein said weights are connected to said covering by tensioning ropes.

6. A long-period heat storage accumulator according to claim 4 including in addition a plurality of floats in the water exterior of the accumulator connected to said covering to support the same.

7. A long-period heat storage accumulator according to claim 1 wherein said covering is in the form of a membrane having a specific weight greater than that of the hot water.

8. A long-period heat storage accumulator according to claim 1 wherein said flexible covering has a plastic foil layer facing the exterior of the accumulator.

9. A long-period heat storage accumulator according to claim 1 having in addition an insulating layer adjoining said covering facing the interior of the accumulator where said layer comprises a hydraulically and thermally resistant material which is penetrated by the hot water.

10. A long-period heat storage accumulator according to claim 1 wherein the portion of the wall structure facing the hot water includes a wire gauze.

11. A long-period heat storage accumulator according to claim 1 wherein said wall structure comprises in part a horizontal wall and having in addition a bellows-type body associated with said horizontal wall to accommodate varying volumes of hot water in said accumulator.

12. A long-period heat storage accumulator according to claim 1 having in addition a flow machine connecting the interior of the accumulator with a heat sink and a flow machine connecting the interior of the accumulator with a heat source and wherein the flow machines produce a change of pressure of the hot water within the accumulator which approximately correspond to the depth that the accumulator is submerged into the exterior water such that the hydrostatic pressure of the exterior water extending over the depth does not exert any additional pressure on the accumulator.

13. A long-period heat storage accumulator according to claim 12 wherein one of the flow machines is a pump and the other flow machine is a turbine and having in addition an electric motor generator to which both flow machines are connected by a single shaft.

14. A long-period heat storage accumulator according to claim 1 wherein the wall structure comprises in part rings, the hoop load capacity of which increases in the upward direction.

15. A long-period heat storage accumulator according to claim 1 wherein the flexible covering is in the form of a membrane having a specific weight less than that of the hot water and wherein the tensioning ropes connect the covering with the bottom of the accumulator.

16. A long-period heat storage accumulator according to claim 1 wherein said means for filling and removing hot water therefrom comprise vertical adjustable piping for filling and removing said water from various levels in said accumulator.

17. A long-period heat storage accumulator according to claim 16 having in addition a heat source adapted to be cooled with water from within said accumulator removed at a lower level thereof and wherein water heated by said heat source is filled into said accumulator at a higher level thereof.

18. A long-period heat storage accumulator according to claim 17 adapted for use with a power station and having in addition means for removing water from a low level of said accumulator to a power station to cool the same when operating in a peak load condition and returning the water to fill the accumulator at an intermediate level and in addition having means for removing water from an intermediate level of said accumulator and conveying it to a power station to cool the same under a low load operation and returning the water to fill the accumulator at a high level.

19. A long-period heat storage accumulator according to claim 1 having in addition connecting pipelines connecting the accumulator with a river whereby during periods when the river can absorb high thermal loads part of the hot water contained within the accumulator may be removed through the pipelines to the river.

* * * * *

UNITED STATES PATENT AND TRADEMARK OFFICE
CERTIFICATE OF CORRECTION

PATENT NO. : 4,174,009
DATED : November 30, 1979
INVENTOR(S) : NIKOLAUS LAING ET AL.

It is certified that error appears in the above-identified patent and that said Letters Patent are hereby corrected as shown below:

Col. 1, line 23 "shaft" should be --shift--;

Col. 2, line 59 "about" should be --above--;

Col. 6, line 31 "coal power" should be --coal powder--;

Col. 10, line 42 "are connected by a single shaft" should be --are mechanically connected.--;

Signed and Sealed this

Twenty-second Day of January 1980

[SEAL]

Attest:

SIDNEY A. DIAMOND

Attesting Officer

Commissioner of Patents and Trademarks